United States Patent
Christenson

(10) Patent No.: US 9,908,694 B2
(45) Date of Patent: Mar. 6, 2018

(54) LIGHTWEIGHT COMMERCIAL DUMPSTER

(71) Applicant: Waste Container Systems L.L.C., Plymouth, MN (US)

(72) Inventor: Jason John Christenson, Plymouth, MN (US)

(73) Assignee: Waste Container Systems L.L.C., Plymouth, MN (US)

( * ) Notice: Subject to any disclaimer, the term of this patent is extended or adjusted under 35 U.S.C. 154(b) by 0 days.

(21) Appl. No.: 15/056,549

(22) Filed: Feb. 29, 2016

(65) Prior Publication Data

US 2016/0325931 A1 Nov. 10, 2016

Related U.S. Application Data

(60) Provisional application No. 62/126,666, filed on Mar. 1, 2015.

(51) Int. Cl.
| | |
|---|---|
| *B65F 1/06* | (2006.01) |
| *B65F 1/14* | (2006.01) |
| *B65F 1/12* | (2006.01) |
| *B65F 1/00* | (2006.01) |
| *B62B 3/04* | (2006.01) |
| *B65F 1/16* | (2006.01) |

(52) U.S. Cl.
CPC .............. *B65F 1/1415* (2013.01); *B62B 3/04* (2013.01); *B65F 1/0006* (2013.01); *B65F 1/122* (2013.01); *B65F 1/1473* (2013.01); *B65F 1/1615* (2013.01)

(58) Field of Classification Search
CPC . B62B 3/106; B62B 2202/20; B62B 2202/22; B65F 1/1415; B65F 1/122; B65F 1/0006; B65F 1/1615; B65F 1/1413
See application file for complete search history.

(56) References Cited

U.S. PATENT DOCUMENTS

| | | | |
|---|---|---|---|
| 1,650,262 A | 11/1927 | Carlton | |
| 2,020,766 A * | 11/1935 | Brown | B62B 3/106 220/9.3 |
| 2,470,977 A | 5/1949 | Chidsey, Jr. | |
| 3,136,575 A * | 6/1964 | Kolling | B65F 1/122 220/844 |
| 3,628,685 A * | 12/1971 | Gordon | B65F 1/02 16/365 |
| 3,669,485 A | 6/1972 | Stihler | |
| 3,685,852 A * | 8/1972 | Wendorf | B65F 1/02 100/100 |
| 3,823,973 A * | 7/1974 | Ramer | B65F 1/122 220/23.4 |
| 3,934,803 A | 1/1976 | Paulus, Jr. | |
| 3,955,826 A * | 5/1976 | Riedesel | B62B 3/10 211/28 |

(Continued)

FOREIGN PATENT DOCUMENTS

EP          2514653 A2    10/2012

*Primary Examiner* — Frank B Vanaman
(74) *Attorney, Agent, or Firm* — Westerman, Champlin & Koehler, P.A.

(57) ABSTRACT

A commercial dumpster includes a bag, a frame that supports the bag in an upright manner, and wheels that are attached to the frame. In some embodiments, the bag includes an open top and a first pair of sleeves that extend from opposing sides of a top edge of the bag. The frame includes a pair of top side bars that extend through the sleeves of the bag.

20 Claims, 16 Drawing Sheets

(56) References Cited

U.S. PATENT DOCUMENTS

| | | |
|---|---|---|
| 4,335,828 A | 6/1982 | Robinson et al. |
| 4,550,849 A | 11/1985 | Adsit |
| 4,705,247 A | 11/1987 | Delmerico |
| 4,817,824 A | 4/1989 | LaFleur et al. |
| 4,989,749 A | 2/1991 | Choi |
| 5,106,041 A | 4/1992 | Jelincic |
| 5,183,180 A | 2/1993 | Hawkins et al. |
| 5,257,794 A * | 11/1993 | Nakamura ............... B62B 3/00 211/182 |
| 5,322,924 A | 6/1994 | Chuang et al. |
| 5,330,071 A | 7/1994 | Parker |
| 5,427,340 A | 6/1995 | Stromsmoe et al. |
| 5,602,402 A | 2/1997 | Yasuda |
| 6,250,488 B1 | 6/2001 | Narahara et al. |
| 6,267,334 B1 | 7/2001 | Siu |
| 6,286,792 B1 | 9/2001 | Best |
| 6,402,098 B2 | 6/2002 | Rosky |
| 6,676,092 B2 | 1/2004 | Tsai |
| 7,198,166 B2 | 4/2007 | Sholinder |
| 7,237,689 B2 | 7/2007 | Maggio, Sr. et al. |
| D564,168 S | 3/2008 | Larin |
| 7,604,143 B2 | 10/2009 | Kerekes, Jr. |
| 7,762,565 B2 | 7/2010 | Hatamian et al. |
| 8,141,921 B2 | 3/2012 | Apps et al. |
| 8,449,008 B2 | 5/2013 | Apps et al. |
| 8,562,212 B1 | 10/2013 | Strickland et al. |
| 8,770,641 B2 | 7/2014 | Hassell et al. |
| 8,777,034 B1 | 7/2014 | Town |
| 9,067,730 B2 | 6/2015 | Curotto |
| 2007/0119850 A1 | 5/2007 | Seiter |
| 2010/0089915 A1* | 4/2010 | Fukuhara ............... B65F 1/1415 220/4.28 |
| 2010/0102575 A1* | 4/2010 | Ferkovich ............ B65F 1/1615 292/259 R |
| 2011/0168854 A1 | 7/2011 | Chen |
| 2012/0001036 A1 | 1/2012 | Santiago |
| 2012/0103981 A1 | 5/2012 | Warren et al. |
| 2012/0106872 A1 | 5/2012 | Blanchard et al. |
| 2012/0325984 A1 | 12/2012 | Moynihan et al. |
| 2013/0146722 A1 | 6/2013 | Branham et al. |
| 2013/0270401 A1 | 10/2013 | Horvath |
| 2013/0330023 A1 | 12/2013 | McGeoghean |
| 2014/0091088 A1 | 4/2014 | Hay et al. |

* cited by examiner

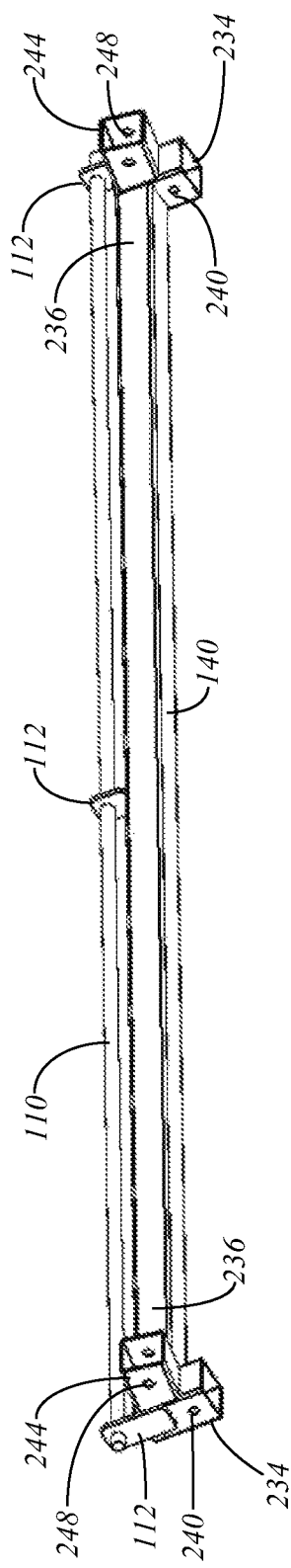
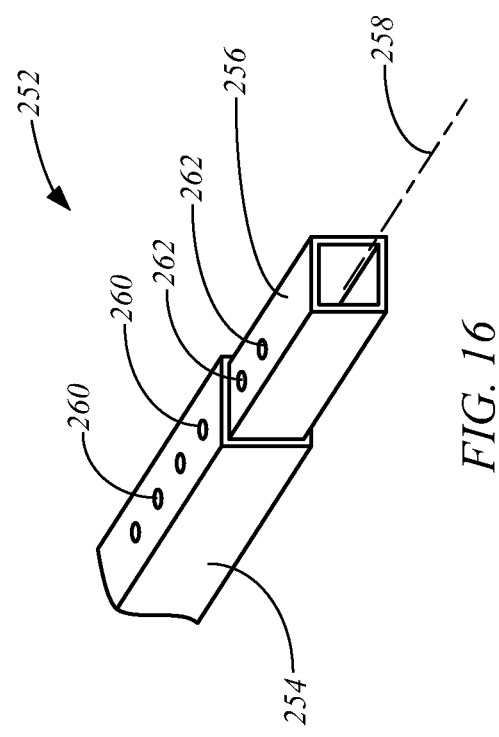
FIG. 15
FIG. 16

LIGHTWEIGHT COMMERCIAL DUMPSTER

CROSS-REFERENCE TO RELATED APPLICATION

The present application is based on and claims the benefit of U.S. provisional patent application Ser. No. 62/126,666, filed Mar. 1, 2015, the content of which is hereby incorporated by reference in its entirety.

FIELD

Embodiments of the present disclosure generally relate to a commercial dumpster for receiving waste material and, more specifically, to a lightweight commercial dumpster that includes a bag supported by a rigid frame.

BACKGROUND

Conventional commercial dumpsters are formed of steel plates that are welded together to form a solid waste container. There are several issues with these conventional dumpsters. For instance, such conventional dumpsters are extremely heavy and often require machinery to assist in loading and unloading the dumpsters from commercial vehicles, which are required to transport the dumpsters. Additionally, conventional commercial dumpsters are incapable of being transformed into a compact state. As a result, conventional dumpsters take up a great deal of space making them difficult to store and transport. Furthermore, in the event that a dumpster becomes damaged or a different sized dumpster is required, the dumpster must be replaced, which generally requires the use of commercial transport and moving equipment.

SUMMARY

Embodiments of the present disclosure are directed to a commercial dumpster. In some embodiments, the dumpster includes a bag, a frame that supports the bag in an upright manner, and wheels that are attached to the frame. In some embodiments, the bag includes an open top and a first pair of sleeves that extend from opposing sides of a top edge of the bag. The frame includes a pair of top side bars that extend through the sleeves of the bag.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 15 is an isometric view of an exemplary rear top member, in accordance with the embodiments of the present disclosure.

FIG. 16 is an isometric view of an exemplary telescoping frame member, in accordance with the embodiments of the present disclosure.

DETAILED DESCRIPTION OF ILLUSTRATIVE EMBODIMENTS

Figure 1:
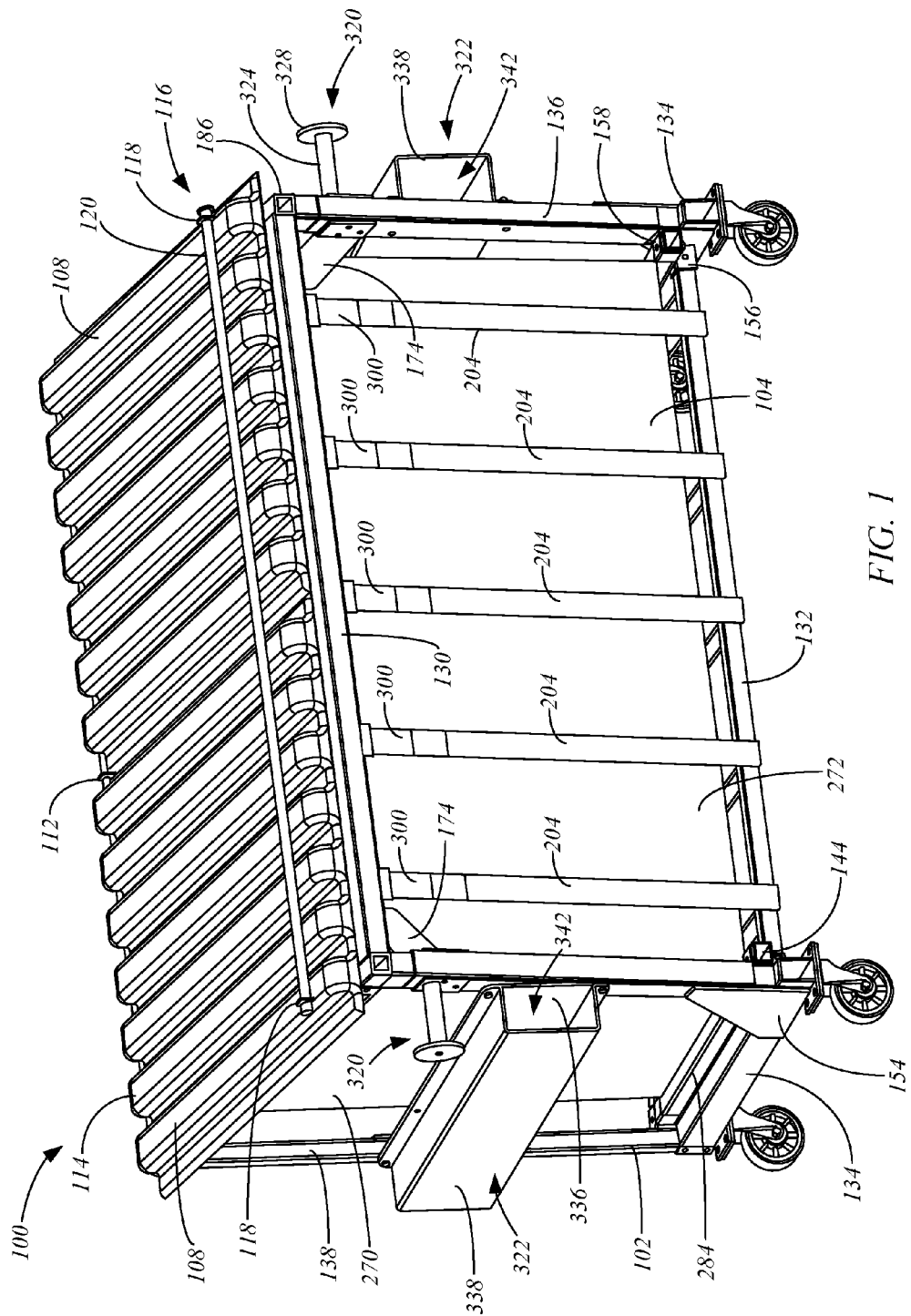
FIGS. 1 and 2 are front isometric views.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
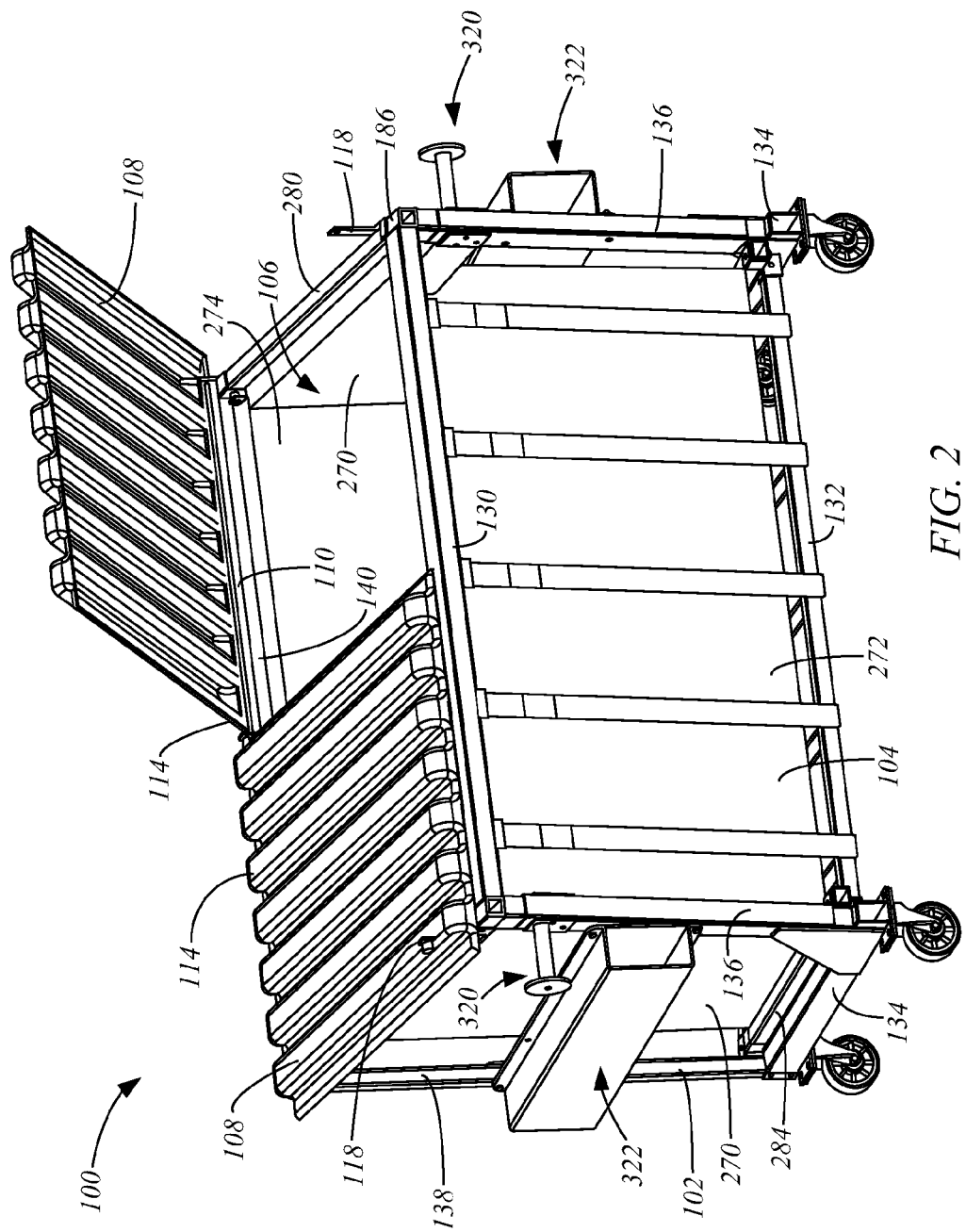
Figure 3:
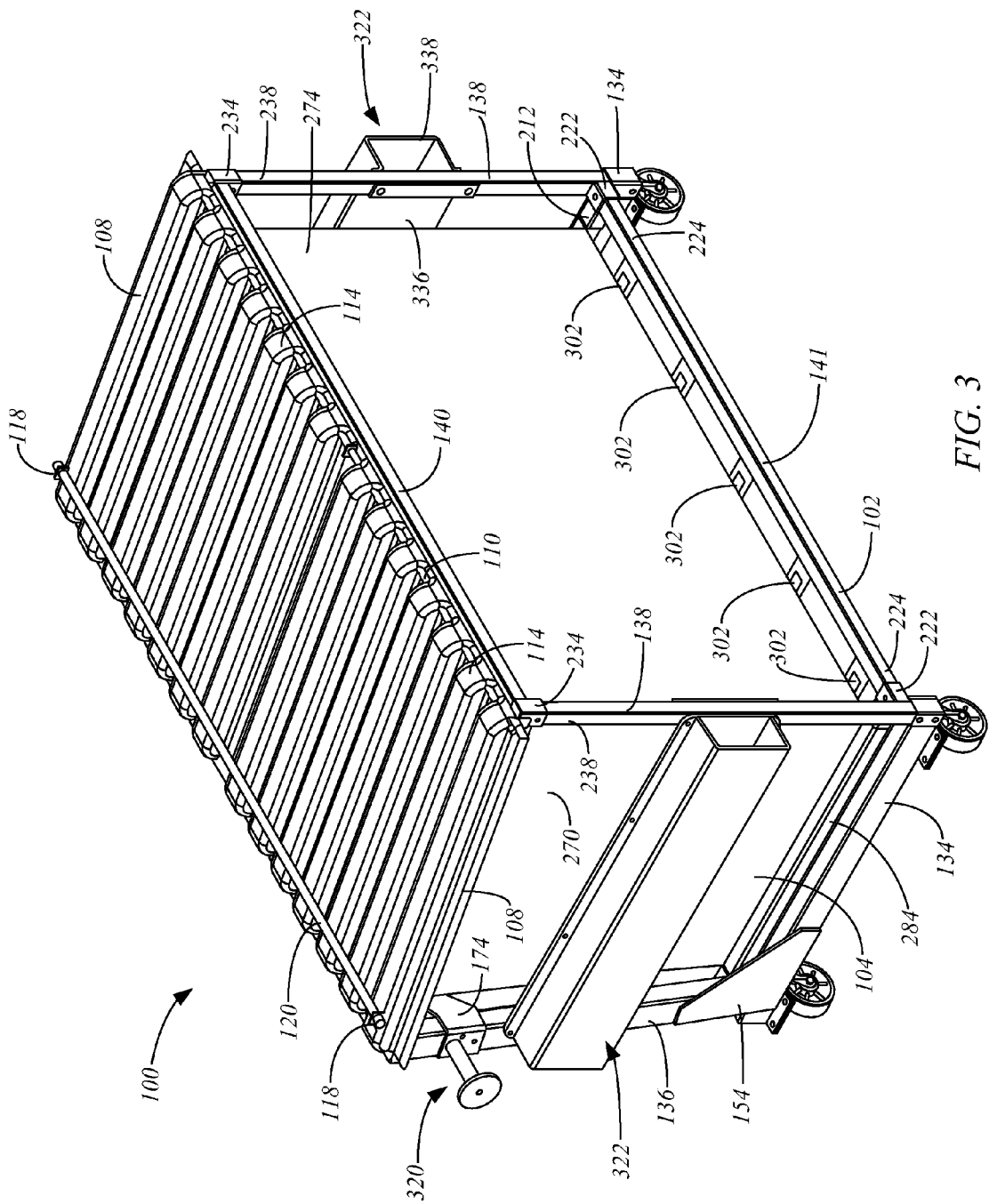
FIG. 3 is a rear isometric view of a commercial dumpster in accordance with exemplary embodiments of the present disclosure.

Embodiments of the present disclosure are directed to a lightweight commercial waste container or dumpster 100 that is configurable to interface with front or rear load waste collection vehicles. FIGS. 1 and 2 are front isometric views, and FIG. 3 is a rear isometric view of a dumpster 100 in accordance with embodiments of the present disclosure. The dumpster 100 generally comprises a frame 102 that supports a waste containment bag 104 in an upright manner, as shown in FIGS. 1-3. The bag 104 includes an interior chamber 106 (FIG. 2), into which liquid and solid waste material may be deposited.

Figure 4:
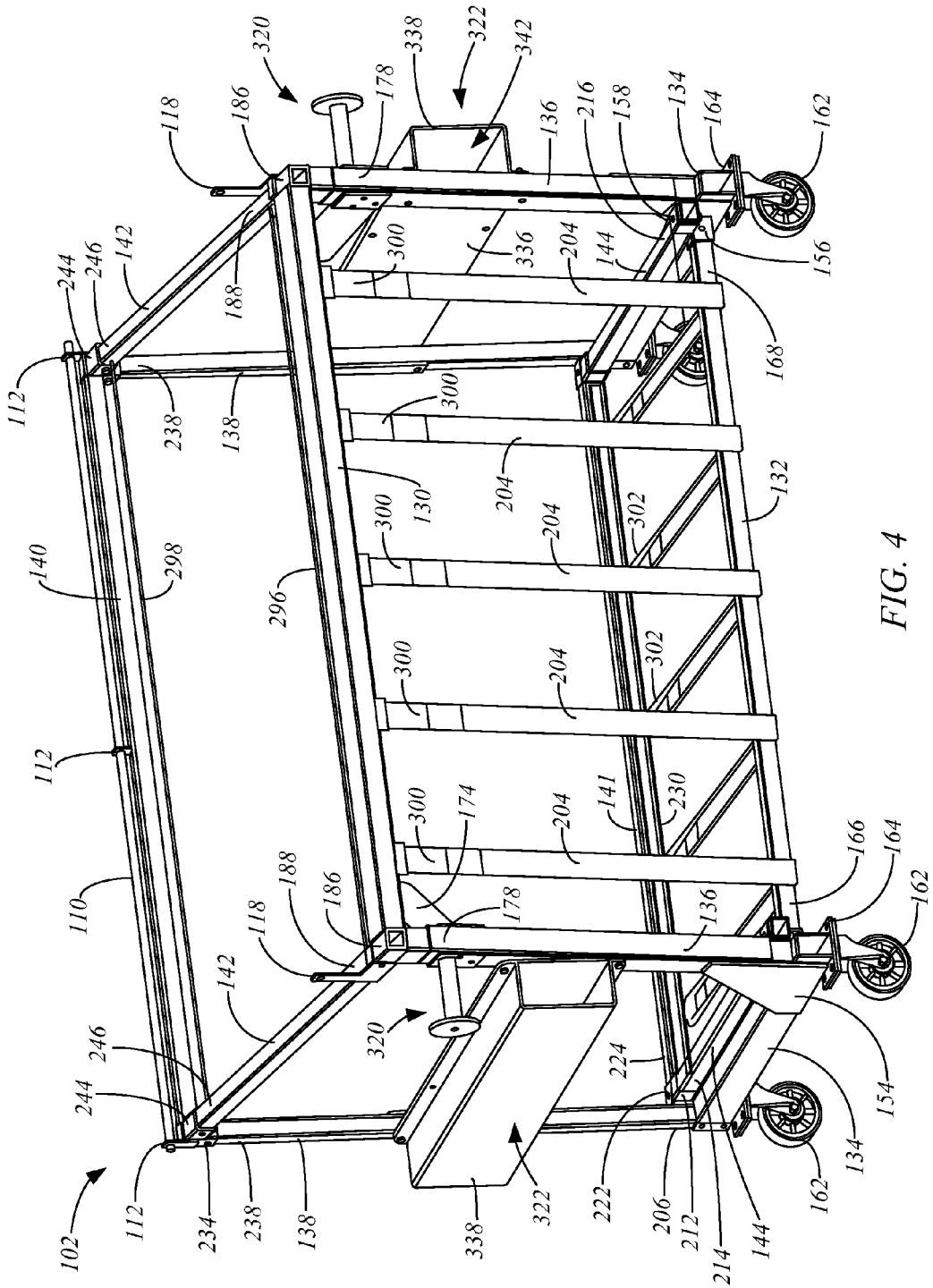
FIG. 4 is a front isometric view of a frame and other components of the dumpster, in accordance with exemplary embodiments of the present disclosure.

FIG. 4 is a front isometric view of the frame 102 and other components of the dumpster 100, in accordance with embodiments of the present disclosure. The frame 102 provides a rigid support for the bag 104, while reducing the overall weight of the dumpster 100 relative to conventional commercial dumpsters. For example, the dumpster 100 weighs approximately 120-160 pounds per cubic yard of capacity, as compared to conventional dumpsters that weigh 350-400 pounds per cubic yard of capacity.

As discussed below in greater detail, the frame 102 comprises multiple frame members. In some embodiments, one or more of the frame members are formed of steel, such as one-eighth inch steel. In some embodiments, one or more of the frame members are formed of plastic, or other suitable rigid material. In some embodiments, one or more of the frame members are in the form of square or rectangular tubing, such as 1-1.5 inch tubing. In some embodiments, some of the frame members are in the form of circular or oval tubing. Thus, while the frame members described below are generally in the form of square or rectangular tubing, embodiments of the present disclosure include a frame 102 formed of frame members having different cross-sectional shapes.

The members of the frame 102 may be attached to each other using various fastening techniques. In some embodiments, at least some of the frame members are attached to each other using a removable fastener or a removable fastening technique that is configured to allow the frame members to be disassembled from each other. Exemplary removable fasteners include nuts and bolts (hereinafter "bolts"), screws, and other types of removable fasteners. This allows the dumpster 100 to be placed in a partially or fully disassembled state, which allows for easy transport and maneuvering of the dumpster 100. Additionally, the compact disassembled state of the dumpster 100 allows it to be stored more efficiently than conventional dumpsters. For example, the disassembled compact state of the dumpster 100 takes up approximately one-tenth of the area of a conventional commercial dumpster.

The ability to disassemble the frame members also has the advantage of making it easy to repair the dumpster 100. For instance, a broken or damaged frame member of the frame 102 may be simply replaced with another frame member.

Additionally, the size of the frame 102 may be adjusted to support a bag 104 of a desired size by swapping out some of the frame members with frame members of different lengths, or by extending or contracting telescoping frame members, for example. This allows the capacity of the dumpster 100 to be easily customized for each customer. For example, the frame 102 and the bag 104 may be sized to have a 1, 1.5, 2, 3, 4, 6 or 8 cubic yard capacity by setting the frame 102 to the appropriate size and using a correspondingly sized bag 104. Moreover, when a customer desires to change the capacity of his or her dumpster 100, it is possible for a single person to make the necessary adjustments through the replacement or adjustment of one or more of the frame members of the frame 102 and the replacement of the bag 104 in a very short period of time. As a result, it becomes unnecessary to replace the entire dumpster 100 to facilitate a change in capacity of a user's dumpster 100.

Non-removable fastening techniques may also be used to join some of the frame members together. Exemplary non-removable fastening techniques include welding, adhesively bonding, or other fastening techniques that are generally considered to be non-removable. Non-removable fastening techniques are those that are generally intended to substantially permanently join the frame members together, such that attempts to disassemble the parts would likely result in damage to one or both of the parts.

In some embodiments, the bag 104 is formed of a highly durable material that resists leakage, punctures, and tearing. In some embodiments, the bag 104 is formed of 18 pound coated polyester. Other materials may also be used to form the bag 104. In addition to reducing the overall weight of the dumpster 100 relative to conventional dumpsters, the use of the bag 104 also facilitates in reducing the dumpster 100 to a highly compact, disassembled state by folding the bag 104. Additionally, the bag 104 allows for easy clean-up of the dumpster 100 by simply replacing a used bag with a new one.

In some embodiments, the dumpster 100 includes one or more lids 108 that cover the interior chamber 106 of the bag 104 as shown in FIG. 1. The one or more lids are pivotably supported on the frame 102 through a suitable hinge that allows each lid 108 to be pivoted from a closed position (FIG. 1) to an open position (FIG. 2). In some embodiments, the hinge is formed using a rod 110 that is attached to the frame 102 using brackets 112, as shown in FIG. 4. A rear end 114 of each of the lids 108 is pivotably attached to the rod 110 to facilitate movement of the one or more lids 108 between their closed and opened positions, as shown in FIG. 2.

In some embodiments, the dumpster 100 includes a lid lock 116 that allows each of the lids 108 to be secured in their closed positions, as shown in FIG. 1. In some embodiments, the lid lock 116 includes a pair of brackets 118 (FIG. 4), and a rod 120 (FIG. 1). The brackets 118 extend through the one or more lids 108, and the rod 120 extends across the lids 108 and through an opening in the brackets 118, as shown in FIG. 1. The ends of the rod 120 may be prevented from being removed from the openings in the brackets 118 using any suitable technique such as using locking pins, for example, to secure the one or more lids 108 in their closed position, as shown in FIG. 1. The one or more lids 108 may be opened to access the interior chamber 106 to deposit waste material or to dump the contents of the interior chamber 106 using a waste collection vehicle, by removing the rod 120 of the lid lock 116, as shown in FIG. 2.

Figure 5:
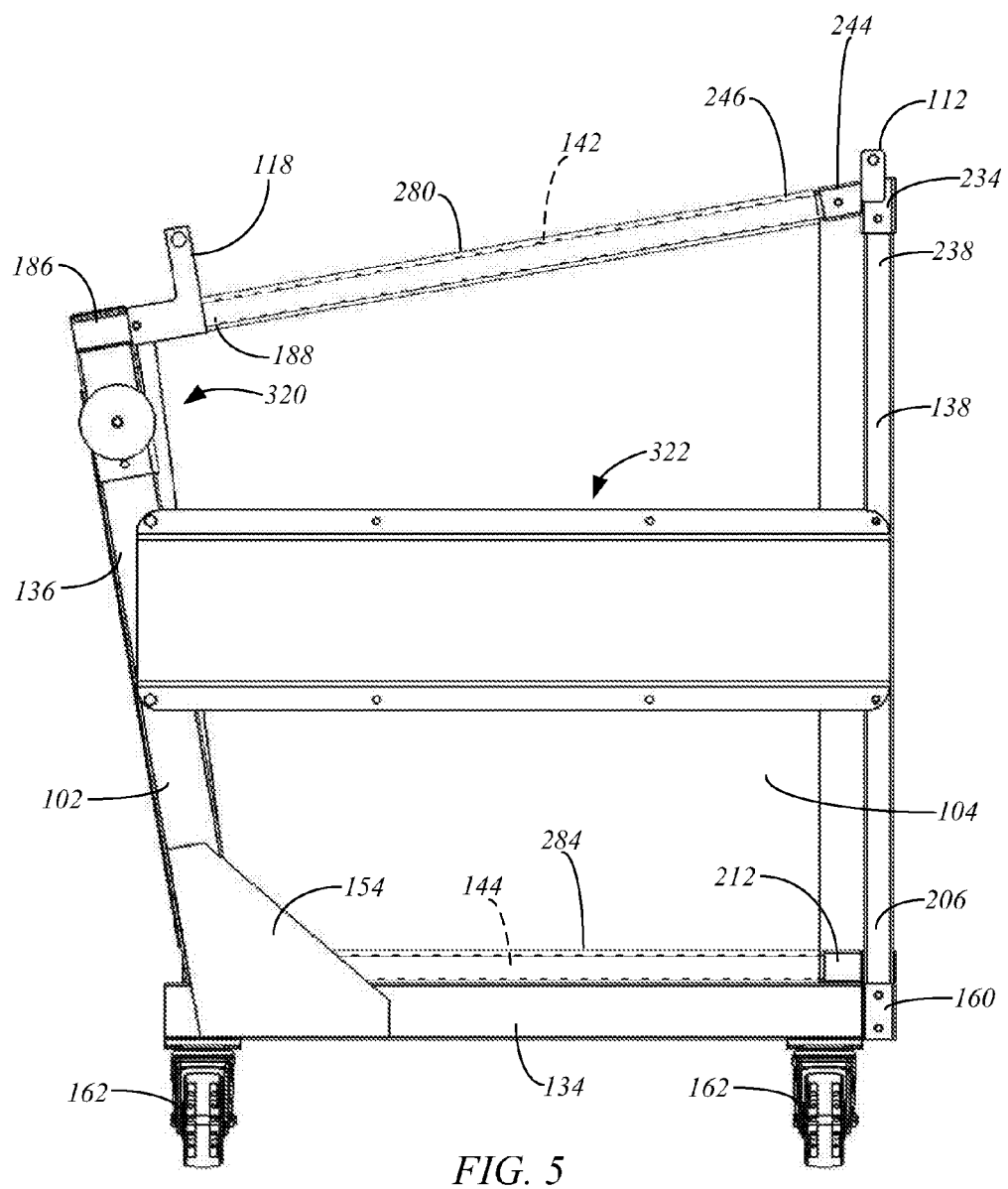
FIGS. 5 and 6 respectively are right side plan and rear plan views of a frame and other components of the dumpster, in accordance with exemplary embodiments of the present disclosure.
Figure 6:
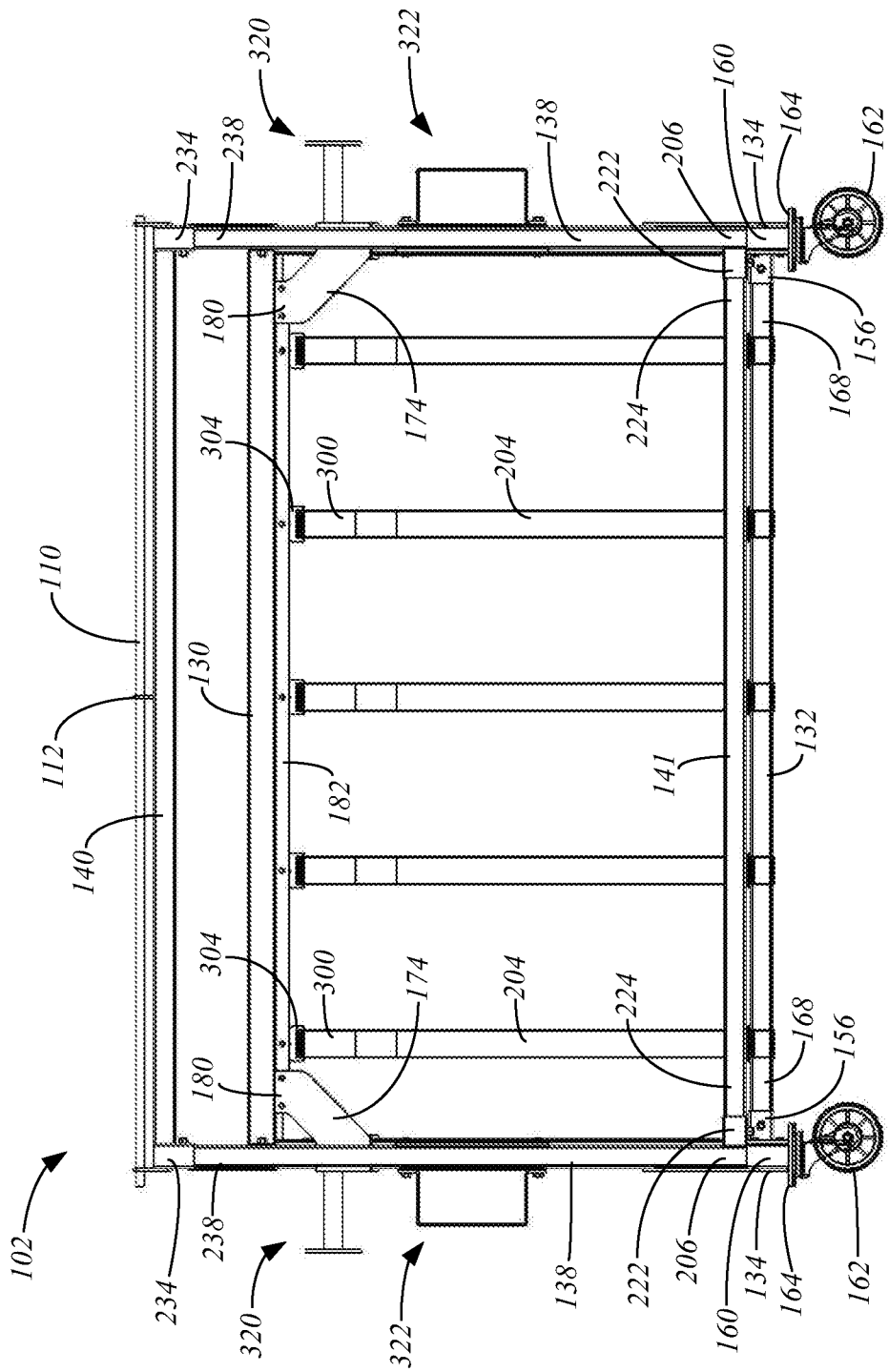

Embodiments of the frame 102 will generally be described with reference to FIGS. 4-16. FIG. 5 is a right side plan view and FIG. 6 is a rear plan view of the frame 102 and other components of the dumpster 100, in accordance with embodiments of the present disclosure. In some embodiments, the frame members forming the frame 102 include a front top member 130, a front bottom member 132, a pair of side bottom support members 134, a pair of front vertical support members 136, a pair of rear vertical support members 138, a rear top member 140, a rear bottom member 141, a pair of top side bars 142, and a pair of bottom side bars 144. Each of these frame members may be attached to each other using a suitable technique, such as those mentioned above. In some embodiments, one or more of the frame members include brackets or receptacles that are configured to facilitate attachment of the frame member to one or more other members. The particular manner in which the members of the frame 102 are attached together is merely exemplary, and other techniques and configurations may be used to form the frame 102.

Figure 7:
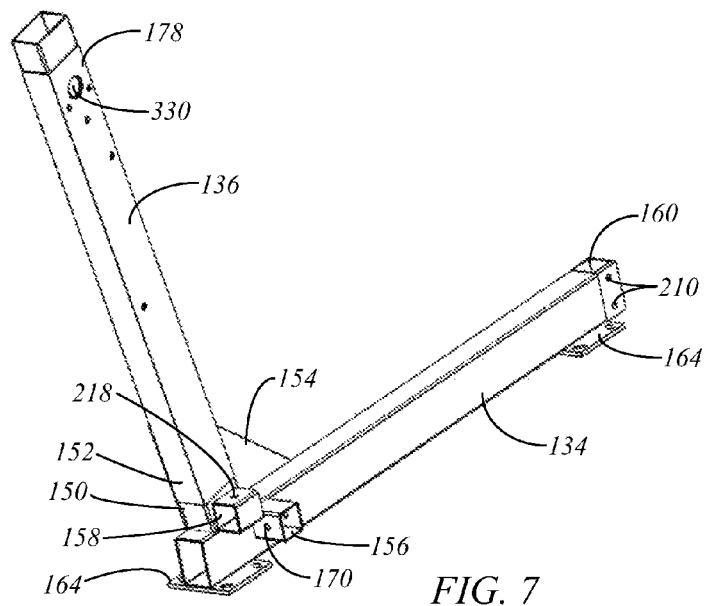
FIG. 7 is an isometric view of a side support member attached to a front vertical support member, in accordance with exemplary embodiments of the present disclosure.

In some embodiments, each side bottom support member 134 includes a bracket or receptacle 150 that receives an end 152 of one of the front vertical support members 136, as shown in FIG. 7, which is an isometric view of the side support member 134 attached to the front vertical support member 136, in accordance with exemplary embodiments of the present disclosure.

In some embodiments, a plate 154 is welded or otherwise attached to the side bottom support member 134 and front vertical support member 136 to secure the members together and fix their relative orientations. In some embodiments, each side bottom support member 134 includes a receptacle or bracket 156 that is configured to receive one of the ends of the front bottom member 132, as shown in FIG. 4. In some embodiments, each side bottom support member 134 includes a receptacle or bracket 158 that is configured to receive an end of the bottom side bar 144, as shown in FIG. 4. In some embodiments, each side bottom support member 134 includes a receptacle or bracket 160 that is configured to receive an end of one of the rear vertical support members 138, as shown in FIG. 4.

In some embodiments, wheels 162, such as casters, are attached to each of the side bottom support members 134, as shown in FIG. 4. In some embodiments, each side bottom support member 134 includes a pair of plates 164 (FIG. 7) that facilitate attachment of the wheels 162 to the side bottom support member 134. The wheels 162 allow the dumpster to be easily moved to a desired location. One advantage the dumpster 100 has over conventional dumpsters is the reduction in noise that occurs during rolling movement of the dumpster 100. This is due, in part, to the open sides of the frame 102.

Figure 8:
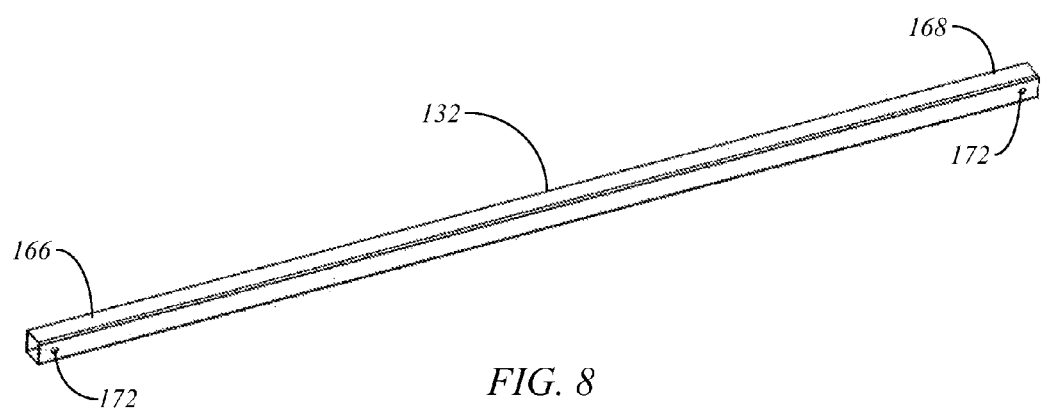
FIG. 8 is an isometric view of a portion of a frame of the dumpster, in accordance with exemplary embodiments of the present disclosure.

FIG. 8 is an isometric view of the front bottom member 132 in accordance with embodiments of the present disclosure. In some embodiments, the front bottom member 132 is attached to the pair of side bottom support members 134. In some embodiments, ends 166 and 168 of the front bottom member 132 are inserted into the receptacle or bracket 156 of the corresponding side bottom support member 134. In some embodiments, a bolt is inserted through apertures 170 of the receptacle or bracket 156 and apertures 172 of the member 132 to removably secure the member 132 to the member 134. Other suitable fastening techniques may also be used to removably or non-removably secure the front bottom member 132 to the pair of side bottom support members 134.

Figure 9:
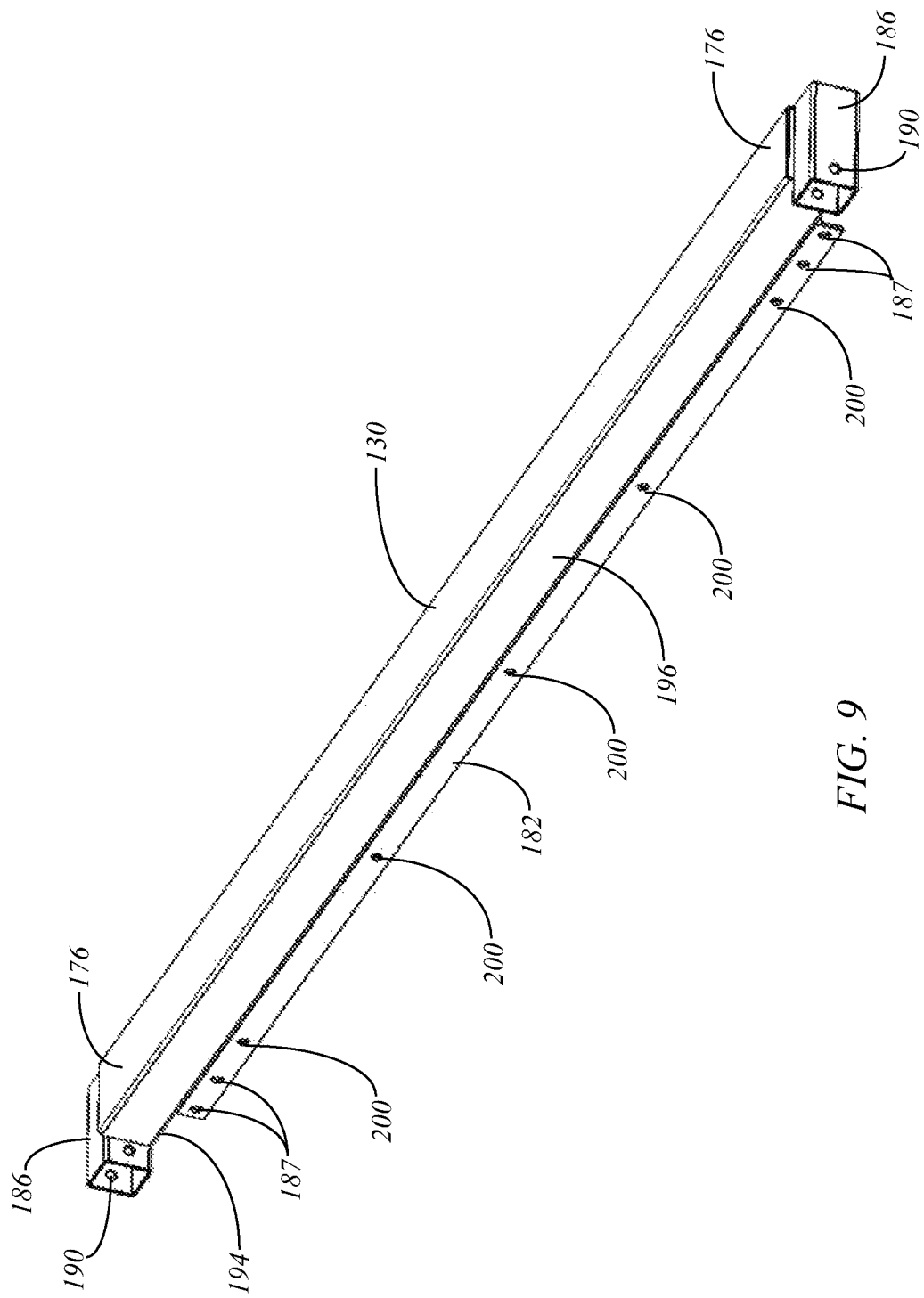
FIG. 9 is an isometric view of an exemplary front top member of the frame, in accordance with embodiments of the present disclosure.
Figure 10:
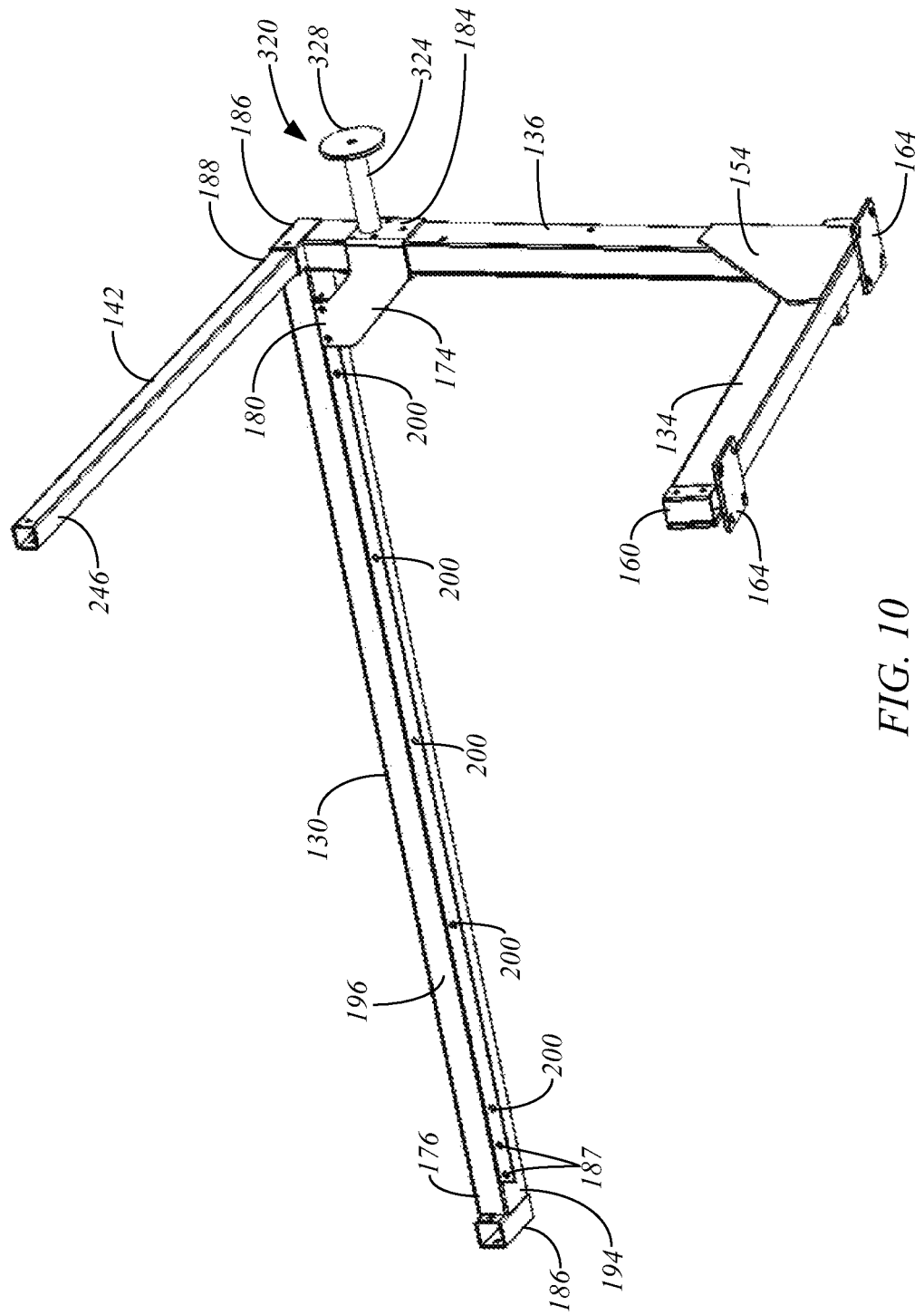
FIG. 10 is an isometric view of a portion of the frame of the dumpster, in accordance with exemplary embodiments of the present disclosure.

FIG. 9 is a rear isometric view of the front top member 130 in accordance with embodiments of the present disclosure. In some embodiments, a bracket 174 is used to attach ends 176 of the front top member 130 to an end 178 of the corresponding front vertical support member 136, as shown in the isometric view of a portion of the frame 102 provided in FIG. 10. In some embodiments, an end 180 of the bracket 174 is attached to a flange 182 of the front top member 130, and an end 184 of the bracket 174 is attached to the front vertical support member 136, as shown in FIG. 10. In some embodiments, each of the brackets 174 is removably attached to the flange 182 of the front top member 130 and the corresponding front vertical support member 136 using a suitable removable fastener. For example, bolts may be inserted through apertures 185 of the bracket 174 and apertures 187 of the flange 182 to secure the bracket 174 to the flange 182, and bolts may be used to secure the bracket 174 to the front vertical support member 136. In some embodiments, each of the brackets 174 is non-removably attached to the flange 182 of the front top member 130 and the corresponding front vertical support member 136 using a suitable non-removable fastening technique.

In some embodiments, each end 176 of the front top member 130 includes a receptacle or bracket 186, as shown in FIG. 9. Each of the receptacles or brackets 186 is configured to receive an end 188 of the corresponding top side bar 142, as shown in FIGS. 4 and 10. In some embodiments, each end 188 of the side bars 142 are removably attached to the receptacle or bracket 186 of the front top member 130 using a suitable removable fastener. For example, a bolt may be inserted through apertures 190 of the receptacle or bracket 186 and through an aperture 192 (FIG. 11) at the end 188 of the top side bar 142 to secure each of the top side bars 142 to the front top member 130. Other suitable fastening techniques for attaching the top side bars 142 to the front top member 130 may also be used including non-removable fastening techniques.

In some embodiments, the flange 182 of the front top member 130 projects downwardly from the front top member 130. In some embodiments, the flange 182 projects from a bottom side 194 of the front top member 130 near a rear side 196 of the member 130, as shown in FIG. 10.

In addition to having one or more apertures 187 that facilitate attachment of the bracket 174 to the front top member 130, the flange 182 may also include apertures 200 that may be used to secure straps 204 (FIG. 4) to the front top member 130, as discussed below in greater detail.

Figure 12:
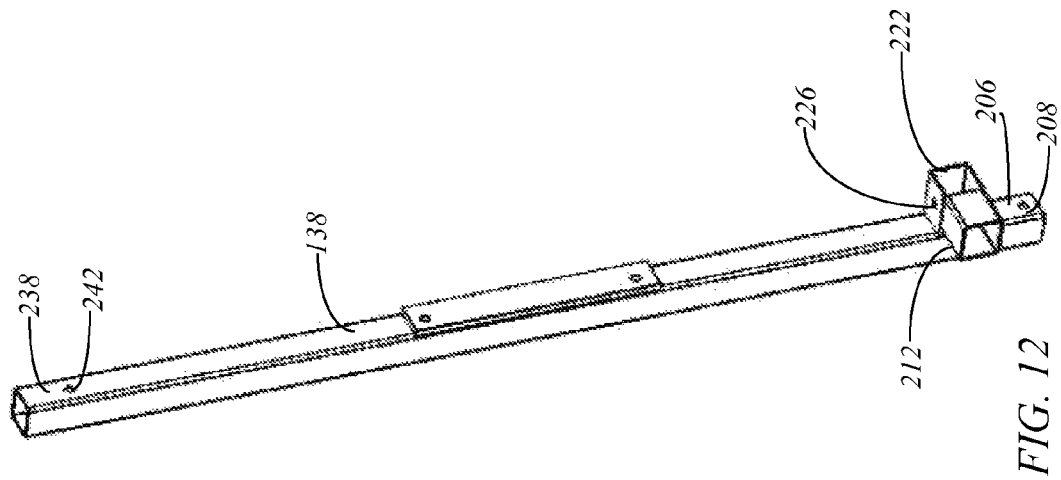
FIG. 12 is an isometric view of an exemplary rear vertical support of the frame, in accordance with embodiments of the present disclosure.
Figure 11:
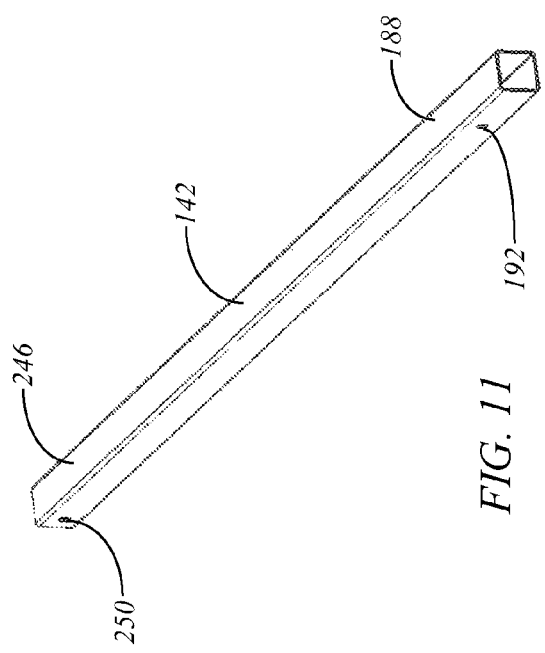
FIG. 11 is an isometric view of an exemplary top side bar of the frame, in accordance with embodiments of the present disclosure.

FIG. 12 is an isometric view of one of the rear vertical support members 138, in accordance with exemplary embodiments of the present disclosure. Each of the rear vertical support members 138 includes an end 206 that is received within the receptacle or bracket 160 of the corresponding bottom support member 134, as shown in FIG. 3. In some embodiments, each end 206 of the rear vertical support members 138 are removably attached to the receptacle or bracket 160 of the corresponding side support member 134 using a suitable removable fastener. For example, a bolt may be inserted through corresponding apertures 208 of the rear vertical support member 138 and apertures 210 of the receptacle or bracket 160 to removably attach the rear vertical support member 138 to the side support member 134. Other suitable fastening techniques for attaching the rear vertical support member 138 to the side support member 134 may also be used including non-removable fastening techniques.

Figure 13:
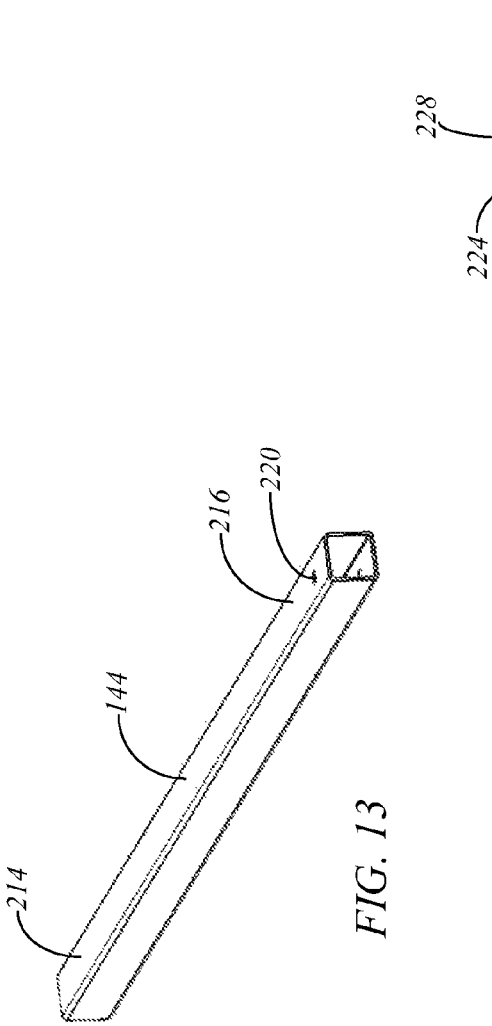
FIG. 13 is an isometric view of an exemplary bottom side bar of the frame, in accordance with embodiments of the present disclosure.

In some embodiments, the rear vertical support member 138 includes a receptacle or bracket 212 that is configured to receive an end 214 of the bottom side bar 144, an isometric view of which is provided in FIG. 13. The end 216 of the bottom side bar 144 is received in the receptacle or bracket 158 of the bottom support member 134, as shown in FIG. 4. In some embodiments, the receptacle or bracket 212 of the rear vertical support member 138, and the receptacle or bracket 158 of the side support member 134 may include apertures that correspond to apertures in the bottom side bar 144 to facilitate the securement of the bottom side bar 144 to the rear vertical support member 138 and the side support member 134. In some embodiments, the receptacle or bracket 212 has a closed end that limits the distance the bottom side bar 144 can be inserted into the receptacle or bracket 212. In some embodiments, only the receptacle or bracket 158 of the side support member 134 includes apertures 218 that correspond to apertures 220 that are located on opposing sides of the end 216 of the bottom side bar 144. In some embodiments, a bolt is inserted through the apertures 218 and 220 to secure the bottom side bar 144 to the bottom support member 134 in a removable manner. Other techniques for fastening the bottom side bar 144 to the rear vertical support member 138 and/or the side support member 134 may also be used including non-removable fastening techniques.

Figure 14:
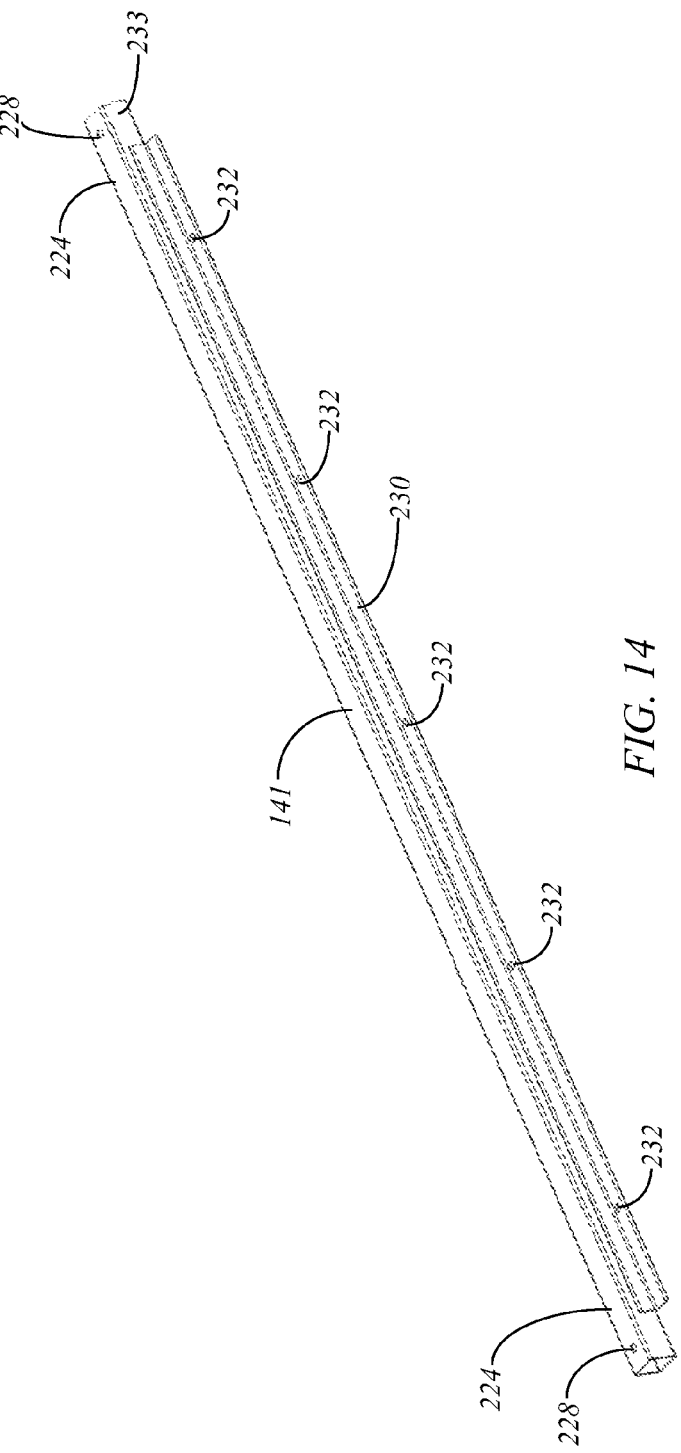
FIG. 14 is an isometric view of an exemplary rear bottom member, in accordance with embodiments of the present disclosure.

FIG. 14 is an isometric view of an exemplary rear bottom member 141, in accordance with embodiments of the present disclosure. In some embodiments, the rear vertical member 138 includes a receptacle or bracket 222 (FIG. 12) that is configured to receive one of the ends 224 of the rear bottom member 141, as shown in FIG. 3. In some embodiments, the rear bottom member 141 is removably attached to the receptacle or bracket 222 of each of the rear vertical support members 138 using a removable fastening technique, such as by inserting a bolt through apertures 226 located on opposing sides of the receptacle 222 and apertures 228 located on opposing sides of the ends 224 of the rear bottom member 141. Other fastening techniques, including non-removable fastening techniques, may also be used to secure the rear bottom member 141 to each of the rear vertical support members 138.

Some embodiments of the rear bottom member 141 include a flange 230 that projects toward the bag 102 or the front of the dumpster 100, as shown in FIG. 4. In some embodiments, the flange 230 includes apertures 232 that facilitate securing ends of the straps 204 to the rear bottom member 141. In some embodiments, the flange 230 is an L-shaped member that is attached to a side 233 of the rear bottom member 141, as shown in FIG. 14.

FIG. 15 is an isometric view of an exemplary rear top member 140, in accordance with the embodiments of the present disclosure. In some embodiments, the rear top member 140 includes receptacles or brackets 234 at each end 236, each of which is configured to receive the end 238 of one of the rear vertical support members 138, as shown in FIG. 3. In some embodiments, the ends 238 are removably attached to the brackets 234 using a suitable removable fastener. For example, in some embodiments, a bolt is inserted through corresponding apertures 240 (FIG. 15) of the receptacle or bracket 234 and apertures 242 (FIG. 12) of the rear vertical support member 138 to secure the end 238 of the rear vertical support member 138 to the rear top member 140. Alternatively, the ends 238 of the rear vertical support members 138 may be non-removably attached to the receptacles or brackets 234.

In some embodiments, the rear top member 140 includes a receptacle or bracket 244 at each end 236, as shown in FIG. 15. Each of the receptacles or brackets 244 are configured to receive an end 246 of one of the top side bars 142, as shown in FIG. 5. In some embodiments, the ends 246 are removably attached to the brackets 244 using a suitable removable fastener. For example, in some embodiments, a bolt is inserted through corresponding apertures 248 (FIG. 15) of the receptacle or bracket 244 and apertures 250 (FIG. 11) of the top side bar 142 to secure the end 246 of each of the top side bar 142 to the rear top member 140. Alternatively, the ends 246 of the top side bars 142 may be non-removably attached to the receptacles or brackets 244.

The use of removable fasteners, such as bolts, to secure at least some of the members of the frame 102 together, facilitates easy replacement of the members of the frame 102. Thus, broken or damaged frame members may be easily replaced to repair the dumpster 100 onsite and without having to replace the entire dumpster 100. This is generally not an option with conventional dumpsters.

Additionally, the capacity of the dumpster 100 can be easily adjusted onsite by replacing some of the members of the frame 102 with different sized members, and replacing the bag 104 with a different sized bag. This too, is not an option with conventional dumpsters.

In some embodiments, the size of the frame 102 is adjusted by replacing some of the members of the frame 102 to adjust the depth, measured from the front bottom member 132 to the rear bottom member 141, a width measured along the front bottom member 132, and/or a height of the frame 102 measured generally along the front vertical support 136 or the rear vertical support 138.

In some embodiments, the capacity of the dumpster 100 is adjusted by changing only the depth of the frame 102. In some embodiments, this adjustment requires only the replacement of the top side bars 142 and the bottom side bars 144 with new bars having the desired length to adjust the size of the frame 102. As a result, this adjustment to the frame does not require the replacement of the side support members 134, the front vertical support members 136, the rear vertical support members 138, the front bottom member 132 or the rear bottom member 141, for example. A bag 104 having the desired capacity is then installed on the frame 102 to complete the capacity change of the dumpster 100.

In some embodiments, the height of the frame 102 may be adjusted to change the capacity of the dumpster 100 such that it can accommodate different sized bags 104. In some embodiments, this height adjustment to the frame 102 involves the replacement of the front vertical support members 136 and the rear vertical support members 138. Similarly, the width of the frame 102 can be adjusted to accommodate different sized bags 104 through the replacement of the front top member 130, the front bottom member 132, the top rear member 140 and the rear bottom member 141.

In some embodiments, some of the members forming the frame 102 are configured to telescope to different lengths. This eliminates the need to replace the members of the frame 102. For example, the top side bars 142 and the bottom side bars 144 may be telescoping members that allow for the adjustment to the depth of the frame 102 without having to remove the members. Similarly, the front vertical support members 136 and the rear vertical support members 138 may be telescoping members that allow for the adjustment to the height of the frame 102 without the removal of the members. Likewise, the front top member 130, the front bottom member 132, the rear top member 140 and the rear bottom member 141 may be telescoping members that allow for the adjustment to the width of the frame 102 without the removal or replacement of the members.

FIG. 16 is an isometric view of an exemplary telescoping frame member 252 that may be used as one or more of the members of the frame 102 mentioned above to adjust the depth, height, or width of the frame 102. In some embodiments, the telescoping frame member 252 includes a tubular frame member 254 and a tubular frame member 256. The tubular frame member 256 is received within an interior of the frame member 254. A length of the telescoping frame member 252, measured along the access 258 may be adjusted by sliding the member 256 into or out of the interior of the member 254. The length of the telescoping frame member 252 can be fixed using any suitable removable fastener. In some embodiments, the frame members 254 and 256 respectively include apertures 260 and 262 through which a suitable removable fastener, such as a bolt, may extend to fix the relative positions of the frame members 254 and 256 along the axis 258. Other forms of telescoping frame members may also be used to provide the desired size adjustability of the frame 102.

Figure 18:
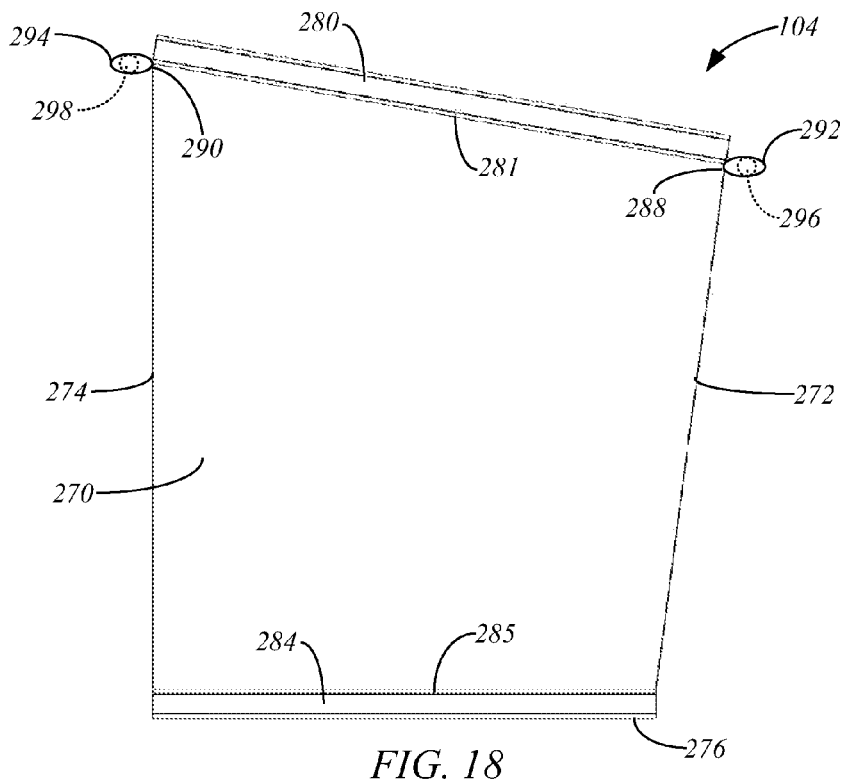
Figure 19:
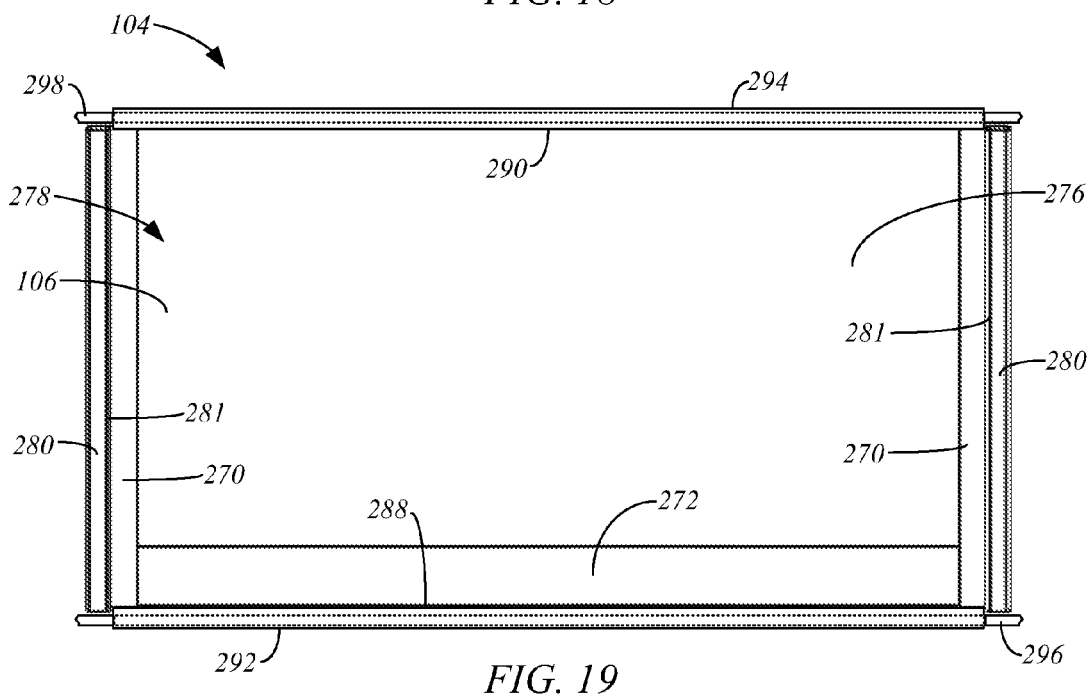

Embodiments of the waste containment bag 104 will be described with reference to FIGS. 17-19, which respectively show a front isometric view, a side plan view and a top plan view of a bag 104, in accordance with exemplary embodiments of the present disclosure. As mentioned above, the bag 104 is formed of a highly durable material, such as 18 pound coated polyester, for example, or other suitable material. In some embodiments, the bag 104 includes opposing side walls 270, a front wall 272, a rear wall 274, and a bottom wall 276 (FIG. 19). In some embodiments, the profile of the bag 104 tapers from the top toward the bottom, as shown in FIG. 18. In some embodiments, the side walls 270 are in the shape of acute trapezoids, as shown in FIG. 18. As a result, the opening 278 to the interior chamber 106 of the bag 104 has a larger area than the bottom 276, as shown in FIG. 19.

In some embodiments, the bag 104 includes integral sleeve members that facilitate attachment of the bag 104 to the frame 102. In some embodiments, the bag 104 includes opposing top sleeve members 280 that extend from (i.e., at or next to) top edges 281 of the side walls 270, as shown in FIG. 17. The sleeve members 280 are each configured to receive one of the top side bars 142 within an interior 282. During assembly of the frame 102, the top side bars 142 are each inserted into the interior 282 of one of the sleeve members 280 before securing the top side bars 142 to the receptacles or brackets 186 of the front top member 130 and/or the receptacles or brackets 244 of the rear top member 140, as indicated in FIG. 5.

Figure 17:
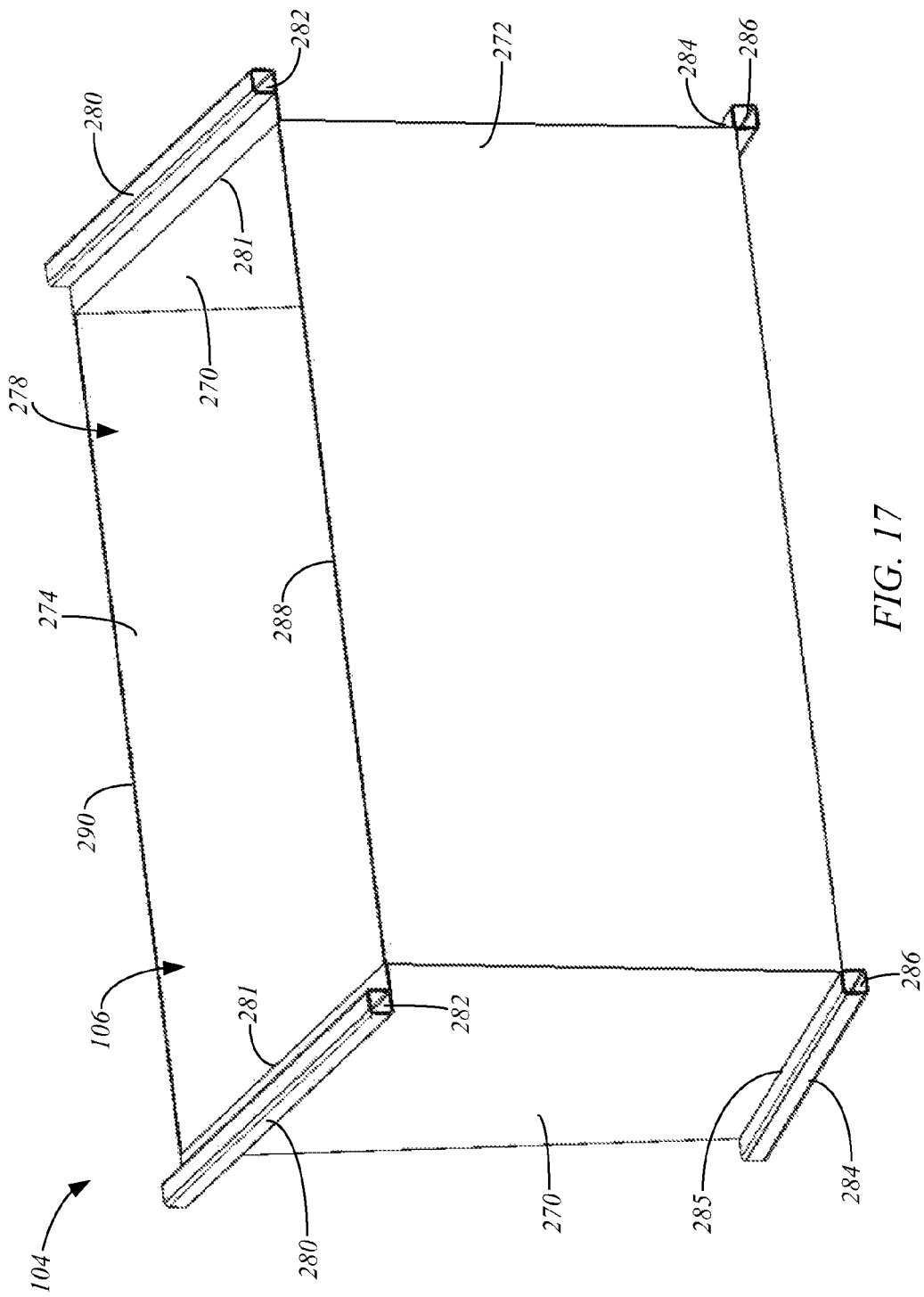
FIGS. 17, 18, and 19 respectively show a front isometric view, a side plan view and a top plan view of a waste containment bag, in accordance with exemplary embodiments of the present disclosure.

In some embodiments, the bag 104 includes sleeve members 284 that extend from (i.e., at or next to) a bottom edge 285 of the side walls 270, as shown in FIG. 17. The sleeve members 284 are each configured to receive one of the bottom side bars 144 within an interior 286. During assembly of the frame 102, the bottom side bars 144 are each inserted into the interior 286 of one of the sleeve members 284 prior to securing the bottom side bars 144 to the receptacles or brackets 158 of the side support member 134 and/or the receptacle or bracket 212 of the rear vertical support members 138.

In some embodiments, the sleeve members 280 bear a significant proportion of the weight of the bag 104 and the material in the interior chamber 106 of the bag 104. In some embodiments the sleeve members 284 also support a significant load.

The bag 104 may also include sleeve members that extend along the top edges 288 and 290 of the front wall 272 and the rear wall 274, respectively. Such sleeve members could be included in addition to, or in the place of the sleeve members 280. Similarly, the bag 104 may include sleeve members that extend along the bottom edge of the front wall 272 and the rear wall 274. Such sleeve members could be used in addition to, or in the place of the sleeve members 284.

When the bag 104 uses the sleeve members 280 to support a substantial amount of the weight of the waste material deposited in the interior chamber 106 of the bag 104, it may be desirable to prevent the top front edge 288 and the top rear edge 290 from sagging, particularly during dumping of the dumpster 100 into a waste collection vehicle. In some embodiments, the bag 104 includes a front sleeve member 292 that extends from (i.e., at or next to) and along the top front edge 288, and/or a rear sleeve member 294 that extends from (i.e., at or next to) and along the top rear edge 290, as shown in FIGS. 18 and 19.

In some embodiments, the frame 102 supports a rod 296 alongside the front top member 130. In some embodiments, the ends of the rod 296 are attached to the top side bars 142, as shown in FIG. 4. In some embodiments, the ends of the rod 296 are threaded and extend through the top side bars 142 and are secured to the top side bars 142 using a nut or other suitable arrangement. Brackets may be positioned along the front top member 130 to provide additional support for the rod 296. In some embodiments, the rod 296 extends through the sleeve 292 when the bag 104 is installed on the frame 102, as indicated in FIGS. 18 and 19.

In some embodiments, the frame 102 supports a rod 298 that extends alongside the rear top member 140, as shown in FIG. 4. In some embodiments, the rod 298 is supported between the top side bars 142. In some embodiments, the ends of the rod 298 are threaded and extend through the top side bars 142 and are secured to the top side bars 142 using a nut or other suitable arrangement. Brackets may be positioned along the rear top member 140 to provide additional support for the rod 298. In some embodiments, the rod 298 extends through the sleeve 294 of the bag 104 when the bag 104 is installed on the frame 102, as indicated in FIGS. 18 and 19.

The support of the top front edge 288 and/or the top rear edge 290 using the sleeve member 292 and the rod 296 or the sleeve member 294 and the rod 298 prevent the edges 288 and 290 from sagging. In some embodiments, the support of the edges 288 and 290 does not involve imposing a significant load on the rods 296 and 298. Rather, the weight of the waste material contained within the chamber 106 of the bag 104 is primarily supported by the sleeve members 280 and the corresponding top side bars 142 of the frame 102. As a result, in some embodiments, the rods 296 and 298 may be formed using ¼ inch steel rods, for example.

In some embodiments, the bottom side bars 144 are formed as rods, such as ¼ inch steel rods, as they are not subjected to significant loads when the bag is filled with waste material. Such rods 144 may extend through the sleeves 284 of the bag, and attach to the frame 102 between the bottom front member 132 and the rear bottom member 141, or between the front vertical support 136 and the rear vertical support 138, for example. In some embodiments, the ends of the rods 144 are secured to the frame 102 using a removable fastener. For example, the rods 144 may include threaded ends and the rods 144 may be secured to the corresponding members of the frame 102 using nuts.

Embodiments of the frame 102 generally have a bottom opening formed between the front bottom member 132, the bottom side bars 144 and the rear bottom member 141, a front opening formed between the front top member 130, the front bottom member 132, and the front vertical support members 136, a rear opening formed between the rear bottom member 141, the rear top member 140 and the rear vertical support members 138, and side opening formed between the bottom side bar 144, the top side bar 142, the front vertical support member 136 and the rear vertical support member 138. This configuration of the frame 102 reduces the overall weight of the dumpster 100, as compared to conventional dumpsters having closed sides.

In some embodiments of the dumpster 100, one or more support members cover at least a portion of the front and/or bottom sides of the frame 102 to prevent the bag 104 from protruding too far through those open sides when it is loaded with waste and during dumping operations using a front load or rear load waste collection vehicle. In some embodiments, the straps 204 perform this function.

In some embodiments, a plurality of the straps 204 extend across at least the front opening of the frame, as shown in FIG. 4. In some embodiments, the straps 204 also extend across the bottom opening of the frame 102, as shown in FIG. 4. In some embodiments, each of the straps 204 includes an end 300 that is attached to the front top member 130, as shown in FIG. 4, and an end 302 that is attached to the rear bottom member 141, as shown in FIG. 3.

Figure 20:
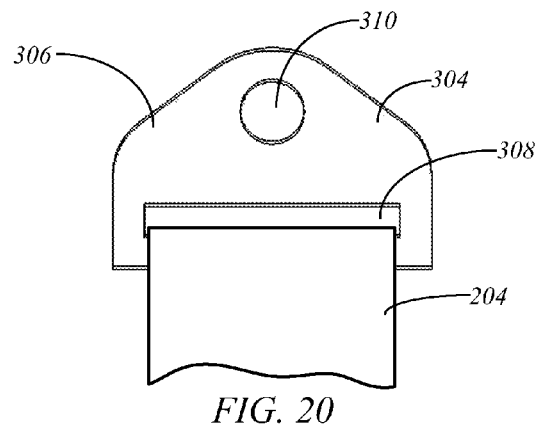
FIG. 20 is a front plan view of an exemplary strap bolt pad and a strap, in accordance with embodiments of the present disclosure.

The connection of the straps 204 to the front top member 130 and the rear bottom member 141 can be accomplished in any suitable manner. In some embodiments, a strap bolt pad 304 is attached at each of the ends 300 and 302. An exemplary embodiment of the strap bolt pad 304 is illustrated in the front plan view shown in FIG. 20. In some embodiments, the strap bolt pad 304 includes a pad body 306 having a slot 308 and an aperture 310. The strap 204 loops through the slot 308 to secure the strap 204 to the pad body 306. In some embodiments, a bolt extends through the aperture 310 of the pad body 306 and through one of the apertures 200 of the front top member 130 or one of the apertures 232 of the rear bottom member 141 to respectively secure the strap bolt pad 304 and the strap 204 to the front top member 130 or the rear bottom member 141. Other techniques for securing the strap bolt pads 304 to the front top member 130 and the rear bottom member 141 may also be used, such as hooks that extend through the apertures 310 of the strap bolt pads 304, or other suitable techniques.

Once the straps 204 are attached to the front top member 130 and the rear bottom member 141, the straps 204 are preferably set to a length that prevents the bag 104 from excessively protruding through the front and bottom openings of the frame 102 when it is loaded with waste material. During a front load or rear load dumping operation, the straps 204 prevent the bag 104 from excessively protruding through the front opening.

Other configurations for the straps 204 may also be used. For example, the straps 204 covering the front opening of the frame 102 may extend only from the front top member 130 to the front bottom member 132. Likewise, the straps 204 extending across the bottom opening of the frame 102 may extend only from the bottom rear member 141 to the front bottom member 132. Additionally, the straps 204 could extend substantially perpendicularly to their orientation illustrated in FIG. 4. For example, the straps 204 could extend across the front opening of the frame 102 by connecting the straps 204 between the front vertical support members 136. Similarly, the straps 204 extending across the bottom opening of the frame 102 may extend between the bottom sidebars 144.

Figure 21:
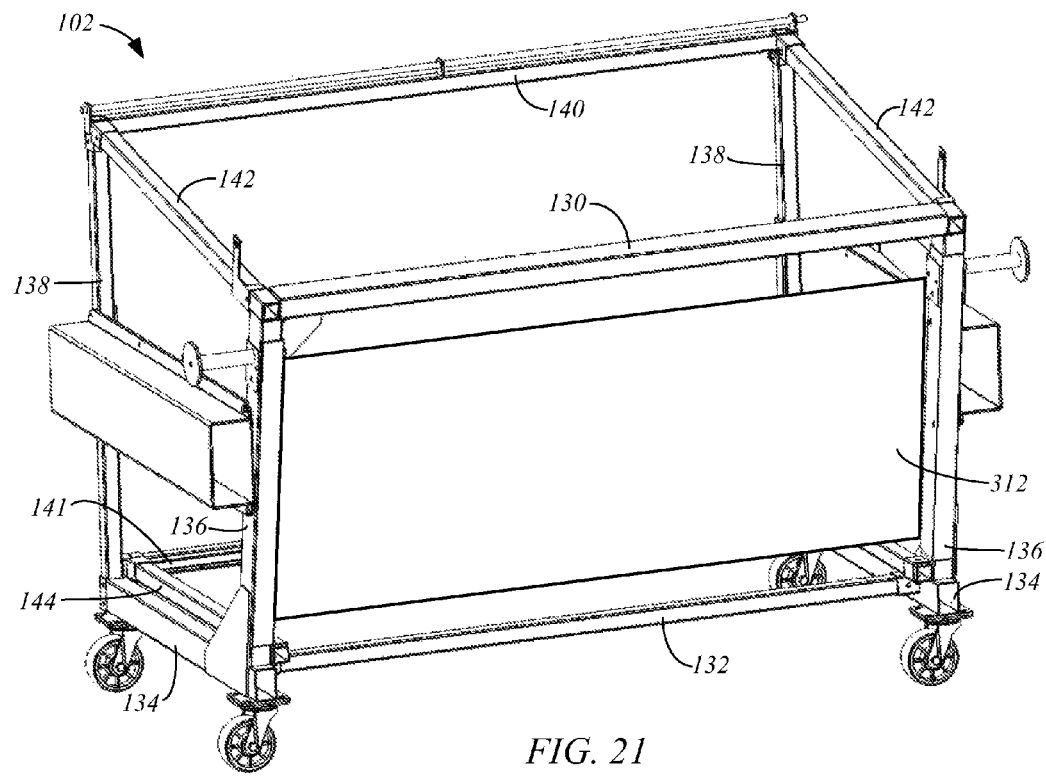
FIG. 21 is an isometric view of the frame, in accordance with exemplary embodiments of the present disclosure.

Alternative techniques for preventing the bag 104 from excessively protruding through the front opening of the frame 102 and/or the bottom opening of the frame 102 may also be used. In one exemplary embodiment, a plate member 312 may extend across the front opening of the frame 102, as illustrated in the isometric view of the frame 102 provided in FIG. 21. In some embodiments, the plate 312 is attached to the front vertical support members 136, the top front member 130, and/or the bottom front member 132 using suitable removable fasteners, such as bolts, or non-removable fasteners, for example. Similarly, a plate may be used to extend across the open bottom of the frame 102, such as a plate that is attached to the bottom side bars 144, the side support members 134, the front bottom bar 132, and/or the rear bottom member 141, for example. Additionally, multiple small plates may be used to extend across the front opening and/or the bottom opening of the frame 102 to prevent the bag 104 from excessively protruding through the front opening and/or the bottom opening of the frame 102. The one or more plates, such as plate 312, may be formed of plastic, metal, or other suitable material.

Additional exemplary components for preventing the bag 104 from excessively protruding through the front opening of the frame 102 and/or the bottom opening of the frame 102 include a plurality of struts, a wire mesh or cage, or other components, that extend across the front and/or bottom opening of the frame 102.

Embodiments of the dumpster 100 are configurable for either a rear load waste collection vehicle or a front load waste collection vehicle. In some embodiments, the dumpster 100 includes a lifting device member that is configured to facilitate dumping the dumpster 100 with a waste collection vehicle. In some embodiments, the lifting device member includes a pair of rear load members 320 and/or a pair of front load members 322 that are attached to the frame 102, as shown in FIGS. 1 and 4. While the illustrated dumpster 100 includes both the rear load members 320 and the front load members 322, embodiments of the dumpster include only the rear load members 320 or only the front load members 322. In some embodiments, both the rear load members 320 and the front load members 322 are removably fastened to the frame 102 using bolts or other suitable removable fasteners. Alternatively, the rear load members 320 and the front load members 322 are non-removably fastened to the frame 102.

Figure 22:
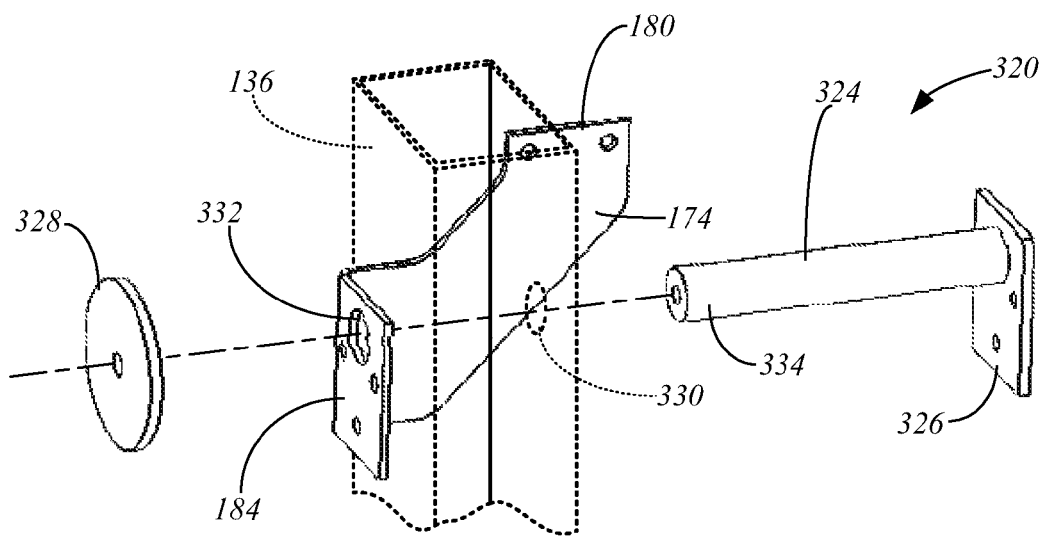
FIG. 22 is an exploded isometric view illustrating the attachment of an exemplary rear load member to the frame, in accordance with exemplary embodiments of the present disclosure.

FIG. 22 is an exploded isometric view illustrating the attachment of an exemplary rear load member 320 to a front vertical support member 136 (shown in phantom lines), in accordance with embodiments of the present disclosure. In some embodiments, the rear load member 320 includes a post 324 attached to a flange 326 and a disc or cap 328. In some embodiments, the post 324 extends through apertures 330 of the front vertical support member 136 from a side that faces the opposing front vertical support member 136, and through an aperture 332 of the bracket 174, which is also attached to the front vertical support member 136. The cap 328 is then secured to the end 334 of the post 324 using bolts or other suitable fasteners. Flange 326 is also secured to the front vertical support member 136 using bolts or other suitable fasteners to complete the attachment of the rear load member 320 to the frame 102.

Figure 23:
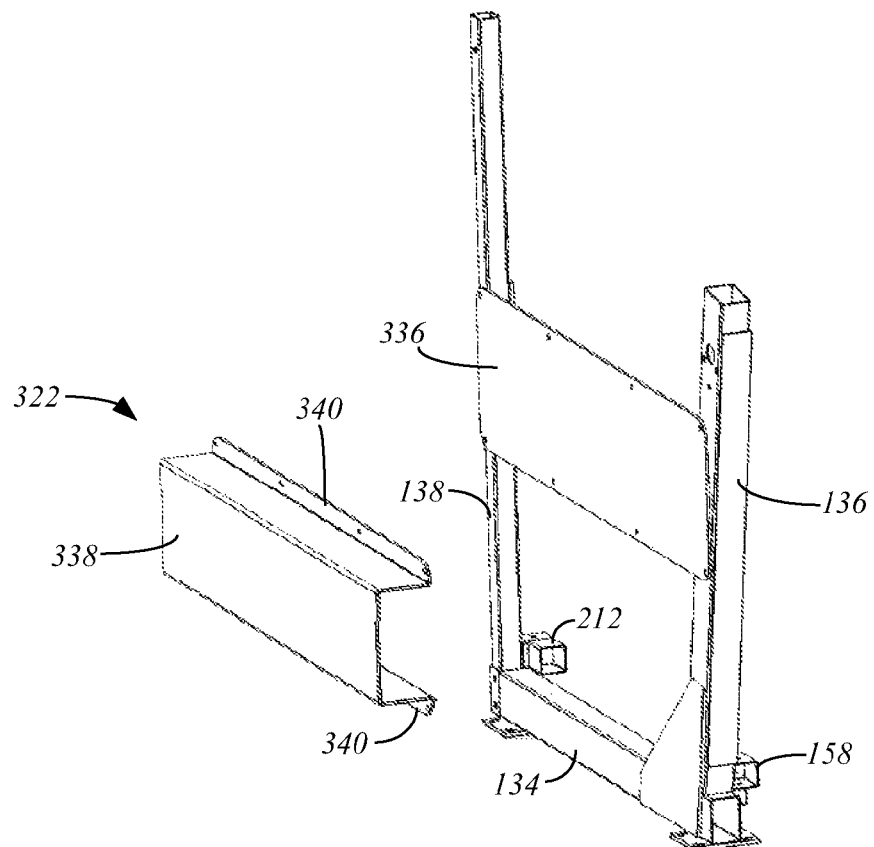
FIG. 23 is an exploded isometric view illustrating the attachment of an exemplary front load member to the frame.

FIG. 23 is an exploded isometric view illustrating the attachment of an exemplary front load member 322 to the frame 102. In some embodiments, the front load member 322 includes a plate 336 and a U-shaped member 338. The plate 336 attaches to and extends between the front vertical support 136 and the rear vertical support member 138 using bolts or other suitable fasteners. The member 338 attaches to the plate 336 using bolts or other suitable fasteners. In some embodiments, the member 338 includes flanges 340, each having a series of apertures that align with apertures of the plate 336 to facilitate securing the member 338 to the plate 336 using bolts or other suitable fasteners. Each of the front load members 322 includes a pocket 342 (FIG. 4) that's formed between the member 338 and the plate 336, and is configured to receive a fork or other front load lifting device to facilitate dumping the dumpster 100 using a front load waste collection vehicle.

In some embodiments, the assembly of the frame 102 is simplified by non-removably attaching some of the frame members to each other, and by attaching some of the frame members together in a collapsible manner. For example, in some embodiments, the front top member 130 is non-removably attached to the front vertical support members 136. In some embodiments, each of the front vertical support members 136 are pivotally attached to the corresponding side support member 134, such as through a bolt or other suitable arrangement, which allows the structure of the front top member 130 and the vertical support members 136 to lay on top of the side support members 134. As a result, the structure of the front top member 130 and the vertical support members 136 may be quickly assembled into a major section of the frame 102 by securing each of the vertical support members 136 into the desired vertical position relative to the side support members 134 (FIG. 4) by using a single bolt, for example. Similarly, in some embodiments, the rear top member 140 is non-removably attached to the rear vertical support members 138. Embodiments of the frame 102 include other combinations of subsets of the members of the frame described above that are secured together in a non-removable manner. Additionally, embodiments of the frame 102 include pivotally attaching one or more of the members of the frame 102 described above to other members of the frame 102 to simplify the assembly of the frame 102.

Although the present invention has been described with reference to preferred embodiments, workers skilled in the art will recognize that changes may be made in form and detail without departing from the spirit and scope of the present disclosure. For example, embodiments of the present disclosure include the combination of one or more embodiments disclosed herein. Additionally, embodiments of the present disclosure include the exclusion of elements that are not shown or described herein.

What is claimed is:

1. A commercial dumpster comprising:
a bag having an open top and including:
a first pair of tubular sleeves each extending from a top edge on opposing sides of the bag; and
a second pair of tubular sleeves extending from a bottom edge on opposing sides of the bag;
a frame supporting the bag in an upright manner, the frame comprising a plurality of frame members including a pair of top side bars extending through the first pair of tubular sleeves, and a pair of bottom side bars extending through the second pair of tubular sleeves;
wheels attached to the frame; and
a lifting device member attached to the frame selected from the group consisting of a pair of rear load members configured to facilitate a rear load dumping operation by a waste collection vehicle, and a pair of front load members configured to facilitate a front load dumping operation by a waste collection vehicle.

2. The dumpster according to claim 1, wherein:
the bag includes a third sleeve extending along a front side of the top edge between the first pair of sleeves; and
the frame includes a first rod extending between the top side bars and through the third sleeve of the bag.

3. The dumpster according to claim 2, wherein:
the bag includes a fourth sleeve extending along a rear side of the top edge between the first pair of sleeves; and
the frame includes a second rod extending between the top side bars and through the fourth sleeve of the bag.

4. The dumpster according to claim 1, wherein the frame members include a front top member having first and second opposing ends, each of the first and second ends of the front top member including a receptacle that receives an end of one of the top side bars.

5. The dumpster according to claim 4, wherein the frame members include a rear top member having first and second opposing ends, each of the first and second ends of the rear top member including a first receptacle that receives an end of one of the top side bars.

6. The dumpster according to claim 5, further comprising at least one lid pivotably attached to the rear top member.

7. The dumpster according to claim 5, wherein the frame members include a pair of side support members positioned on opposing sides of the frame, wherein the wheels are attached to the side support members.

8. The dumpster according to claim 7, wherein the frame members include a pair of front vertical support members each having a first end attached to one of the side support members and a second end attached to one of the first and second ends of the front top member.

9. The dumpster according to claim 8, wherein the frame members include a front bottom member having opposing ends, each of which is each received within a first receptacle of one of the side support members.

10. The dumpster according to claim 9, wherein the frame members include a pair of rear vertical support members each having a first end attached to one of the side support members and a second end attached to one of the first and second ends of the rear top member.

11. The dumpster according to claim 10, wherein the first end of each of the rear vertical support members is received within a second receptacle of one of the side support members, and the second end of each of the rear vertical support members is received within a second receptacle of the rear top member.

12. The dumpster according to claim 10, wherein the frame members include a rear bottom member having opposing ends, each of which is attached to one of the rear vertical support members.

13. The dumpster according to claim 12, wherein each of the bottom side bars includes a first end attached to one of the side support members and a second end attached to one of the rear vertical support members.

14. The dumpster according to claim 12, further comprising a plurality of straps extending from the front top member to the rear bottom member.

15. The dumpster according to claim 12, further comprising a plate extending between the pair of front vertical support members.

16. The dumpster according to claim 1, wherein the lifting device member is removably attached to the frame.

17. The dumpster according to claim 16, wherein the lifting device member comprises the pair of rear load members, each of the rear load members including a post extending through one of the front vertical support members, a flange attached to a first end of the post, and a cap attached to a second end of the post.

18. The dumpster according to claim 17, wherein the lifting device member comprises the pair of front load members, each front load member comprising a plate attached to one of the front vertical support members and to one of the rear vertical support members, and a U-shaped member attached to the plate.

19. The dumpster according to claim 1, wherein the frame members are fastened together using a plurality of fasteners, and the frame members have a fixed position relative to each other.

20. A commercial dumpster comprising:
a bag having an open top and a first pair of sleeves each extending from a top edge on opposing sides of the bag;
a frame supporting the bag in an upright manner, the frame comprising a plurality of frame members including a pair of top side bars extending through the sleeves;
wheels attached to the frame; and
a lifting device member that is removably attached to the frame and is selected from the group consisting of a pair of rear load members configured to facilitate a rear load dumping operation by a waste collection vehicle, and a pair of front load members configured to facilitate a front load dumping operation by a waste collection vehicle;
wherein:
the bag includes a second pair of sleeves extending from a bottom edge on opposing sides of the bag;
the frame members include a pair of bottom side bars extending through the second pair of sleeves;
the frame members include a front top member having first and second opposing ends, each of the first and second ends of the front top member including a receptacle that receives an end of one of the top side bars;
the frame members include a rear top member having first and second opposing ends, each of the first and second ends of the rear top member including a first receptacle that receives an end of one of the top side bars;
the frame members include a pair of side support members positioned on opposing sides of the frame, wherein the wheels are attached to the side support members;
the frame members include a pair of front vertical support members each having a first end attached to one of the side support members and a second end attached to one of the first and second ends of the front top member;
the frame members include a front bottom member having opposing ends, each of which is each received within a first receptacle of one of the side support members;
the frame members include a pair of rear vertical support members each having a first end attached to one of the side support members and a second end attached to one of the first and second ends of the rear top member;
the frame members include a rear bottom member having opposing ends, each of which is attached to one of the rear vertical support members; and
each of the bottom side bars includes a first end attached to one of the side support members and a second end attached to one of the rear vertical support members.

* * * * *